United States Patent Office 3,714,971
Patented Feb. 6, 1973

3,714,971
HIGH TEMPERATURE REFRACTORY LINING
Charles R. Venable, Jr., Bartlesville, Okla., assignor to Phillips Petroleum Company
Filed Jan. 25, 1971, Ser. No. 109,683
Int. Cl. F16l 9/14; B32b 15/04
U.S. Cl. 138—143                    5 Claims

ABSTRACT OF THE DISCLOSURE

A refractory lining composition comprising an inner chrome alumina prefired shape and an outer layer comprising lightweight alumina castable.

Figure 1:
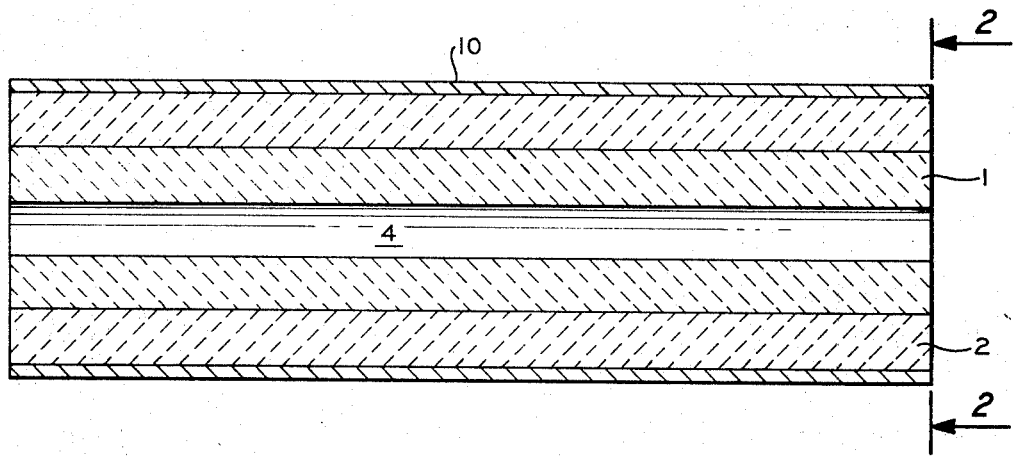

This invention relates to high temperature refractory linings.

In one of its more specific aspects, this invention relates to a refractory lining for conduit.

The use of refractory linings for conduits is well known. Generally, the nature of the lining will depend upon the characteristics of the material being conveyed through the conduit.

Frequently, refractory linings are comprised of two castable layers of different materials. Such a system usually necessitates the retention of the linings to the conduit by anchors which are fastened to the interior of the conduit and around which the castable layers are poured and made to adhere. Such linings are frequently difficult to install and, due to the interaction of the layers upon each other, the entire assembly tends to deteriorate.

In partial alleviation of these difficulties, it has become customary to employ an inner metal shroud or liner and an outer metal conduit with a castable refractory being positioned therebetween. In this manner, anchoring problems are disposed of. However, due principally to limitations of the inner metal shroud in respect to operational conditions, such metal liners are frequently of short life. The apparatus of this invention comprises a lining which solves these problems.

According to the present invention there is provided a refractory lining composition for conduits which comprises an inner chrome alumina prefired shaped conduit and an outer layer compirsing lightweight alumina castable positioned peripheral to the shaped conduit.

The refractory lining composition of the present invention possesses many advantages. It is easy to fabricate, possesses excellent corrosion and erosion resistance and can be installed in comparatively thin layers, the composite being particularly serviceable when employed in conduits for the transfer of hydrocarbons and high pressure steam.

The inner component of the composition of this invention comprises a chrome alumina prefired refractory shaped conduit, preferably of tubular configuration. It is made from a mixture consisting essentially of refractory brick making, size graded, substantially nonplastic, refractroy, metal oxide aggregate and from about 1 to about 15 percent by weight of a water-insoluble, finely divided, high purity $Cr_2O_3$, substantially all the discrete particles of which are of substantially uniform size averaging less than about 1 micron in diameter. It is a high purity, low silica refractory comprising alumina grog, or aggregate, bonded by a chrome-alumina solid solution matrix. It will have a typical chemical analysis of about 89.7 weight percent alumina, 10 weight percent chromic oxide with traces of silica, titania, and magnesia.

Between the inner chrome alumina prefired refractory shaped conduit and the outer conduit there is installed a high-purity bubble alumina castable. This material is substantially silica free, is castable, and comprises alumina bubbles in calcium aluminate. After firing at 1800° F., it has a density of from about 70 to about 75 pounds per cubic foot, a compressive strength of from about 450 to about 900 ps.i. and a thermal conductivity of about 4.6 B.t.u./hr./sq. ft./° F./in. at 2200° F. mean temperature.

The lining of this invention is easily installed in the conduit. The refractory shape is positioned within the outer conduit and the bubble alumina is cast in place in the annulus. The lining is cured after which the conduit can be placed in operation.

Figure 2:
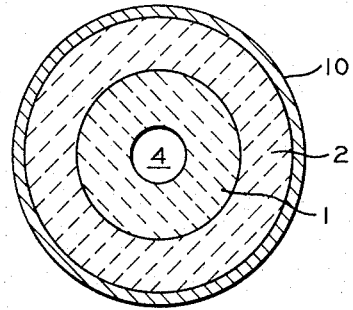

The apparatus of this invention will be more easily understood if explained with reference to the attached drawing in which FIG. 1 is a view of a conduit in elevation and FIG. 2 is a view in cross section through section 2—2 of FIG. 1.

Referring to that drawing there is shown a chrome alumina prefired refractory shaped conduit 1 having channel 4 formed therethrough.

Positioned between the inner chrome alumina prefired refractory shaped conduit and outer conduit 10 there is installed the bubble alumina castable layer 2.

The lining of the present invention is particularly suitable for use in transfer lines for reformed gases produced during the production of ammonia, hydrogen, and methanol.

It will be evident that various modifications can be made to the method of this invention. Such are considered, however, to be within the scope of the invention.

1. A conduit lining comprising:
  (a) a chrome alumina prefired shaped conduit formed of an alumina aggregate bonded by a chrome-alumina solid solution matrix; and,
  (b) a castable layer positioned peripheral to said shaped conduit, said castable layer being formed of bubble alumina.

2. The lining of claim 1 in which said shaped conduit is comprised of about 89.7 weight percent alumina and about 10 weight percent chromic oxide.

3. The lining of claim 1 in which said shaped conduit comprises a refractory brick making, size graded, substantially nonplastic, refractory, metal oxide aggregate and from about 1 to about 15 weight percent water-insoluble $Cr_2O_3$ particles having a substantially uniform size averaging less than about 1 micron in diameter.

4. The lining of claim 3 in which said castable layer of bubble alumina has a density of from about 70 to about 75 pounds per cubic foot, a compressive strength of from about 450 to about 900 p.s.i. and a thermal conductivity of about 4.6 B.t.u./hr./sq. ft./° F./in. at 2200° F. after firing at 1800° F.

5. The lining of claim 3 in which said shaped conduit is compirsed of about 89.7 weight percent alumina and about 10 weight percent chromic oxide.

References Cited

UNITED STATES PATENTS

| 3,568,723 | 3/1971 | Sowards | 138—177 |
| 3,456,690 | 7/1969 | Weed | 138—140 |

OTHER REFERENCES

Characteristics of Wrought & Cast Aluminum, August 1940, p. 626 of American Machinist.

EDGAR W. GEOGHEGAN, Primary Examiner
A. M. ZUPCIC, Assistant Examiner

U.S. Cl. X.R.
138—178; 264—60; 161—225; 156—89